United States Patent
Urdang et al.

(10) Patent No.: US 7,114,173 B2
(45) Date of Patent: Sep. 26, 2006

(54) TECHNIQUE FOR SYNCHRONIZING DELIVERIES OF INFORMATION AND ENTERTAINMENT IN A COMMUNICATIONS NETWORK

(75) Inventors: Erik G. Urdang, Boulder, CO (US); Louis D. Williamson, Denver, CO (US)

(73) Assignee: AOL Time Warner Interactive Video Group, Inc., New York, NY (US)

( * ) Notice: Subject to any disclaimer, the term of this patent is extended or adjusted under 35 U.S.C. 154(b) by 452 days.

(21) Appl. No.: 10/324,196

(22) Filed: Dec. 20, 2002

(65) Prior Publication Data
US 2003/0208765 A1   Nov. 6, 2003

Related U.S. Application Data

(60) Provisional application No. 60/377,963, filed on May 3, 2002.

(51) Int. Cl.
*H04N 7/173* (2006.01)
(52) U.S. Cl. ............... 725/88; 725/89; 725/94; 725/98; 725/102; 386/68
(58) Field of Classification Search ............ 725/90–94, 725/98, 102–103, 114–118, 144–148, 86–89, 725/101, 133–134, 141–142, 153; 386/6–8, 386/68–70
See application file for complete search history.

(56) References Cited

U.S. PATENT DOCUMENTS

| | | | |
|---|---|---|---|
| 5,253,066 A | 10/1993 | Vogel | |
| 5,335,277 A | 8/1994 | Harvey et al. | |
| 5,357,276 A | 10/1994 | Banker et al. | |
| 5,371,551 A | 12/1994 | Logan et al. | |
| 5,436,917 A | 7/1995 | Karasawa | |
| 5,477,263 A * | 12/1995 | O'Callaghan et al. | 725/102 |
| 5,543,927 A | 8/1996 | Herz | |
| 5,550,640 A | 8/1996 | Tsuboi et al. | |
| 5,579,183 A | 11/1996 | Van Gestel et al. | |
| 5,583,561 A * | 12/1996 | Baker et al. | 725/93 |
| 5,671,386 A | 9/1997 | Blair et al. | |
| 5,687,275 A | 11/1997 | Lane et al. | |
| 5,699,360 A | 12/1997 | Nishida et al. | |
| 5,727,113 A | 3/1998 | Shimoda | |

(Continued)

OTHER PUBLICATIONS

Roy Furchgott, "Don't want people to control their T.V.s?", The New York Times, Aug. 24, 2000, Section G, p. 1, col. 2, Circuits, 2000 The New York Times Company.

(Continued)

*Primary Examiner*—Ngoc Vu
(74) *Attorney, Agent, or Firm*—Michael P. Straub; Straub & Pokotylo (57) ABSTRACT

In a broadband communications system, e.g., a cable system, a broadcast program stream is transmitted to broadcast programming content, and the broadcast program stream is recorded in a headend of the system to enable a user to perform network private video recorder (NPVR) functions (e.g., rewinding, pausing, and fast-forwarding) on the programming content in the recorded program stream. In accordance with the invention, a delay is introduced into the transmission of the broadcast program stream to reduce the unsynchronization between its transmission and that of the recorded program stream. In an illustrative embodiment, the amount of the delay is a function of the time required for recording the broadcast program stream and processing a user request for a recorded program stream. In another embodiment, the amount of the delay is predetermined.

56 Claims, 5 Drawing Sheets

U.S. PATENT DOCUMENTS

| | | | |
|---|---|---|---|
| 5,729,648 | A | 3/1998 | Boyce et al. |
| 5,748,254 | A | 5/1998 | Harrison et al. |
| 5,781,227 | A | 7/1998 | Goode et al. |
| 5,822,493 | A | 10/1998 | Uehara et al. |
| 5,915,068 | A | 6/1999 | Levine |
| 5,941,951 | A * | 8/1999 | Day et al. .................... 709/233 |
| 6,005,603 | A | 12/1999 | Flavin |
| 6,046,760 | A | 4/2000 | Jun |
| 6,052,588 | A | 4/2000 | Mo et al. |
| 6,055,358 | A | 4/2000 | Traxlmayr |
| 6,108,002 | A | 8/2000 | Ishizaki |
| 6,115,532 | A | 9/2000 | Saeki |
| 6,118,922 | A | 9/2000 | Van Gestel et al. |
| 6,172,712 | B1 | 1/2001 | Beard |
| 6,233,389 | B1 | 5/2001 | Barton et al. |
| 6,324,338 | B1 | 11/2001 | Wood et al. |
| 6,480,667 | B1 * | 11/2002 | O'Connor .................... 386/83 |
| 2003/0170003 | A1 * | 9/2003 | Levesque et al. ............. 386/68 |

OTHER PUBLICATIONS

"PVR copyright concerns raised", Audio Week, Aug. 23, 1999, section: This Week's News, 1999 Warren Publishing, Inc.

Dale Buss, "Ultra TV", Brandmarketing, Sep. 1999, vol. VI, No. 9, p. 74, ISSN 1091-6962, 1999 Responsive Database Services, Inc. Business and Industry; 1999 Fairchild Publications.

Brian Lowry, "Television, as you like it; Today's gadgetry is smart enough to let viewers choose camera angles, or kick back and rewind as the action unfolds live. Watch it, and it watches back", Los Angeles Times, Feb. 13, 2000, section: Calendar, p. 8, Calendar Desk, 2000 Times Mirror Company.

Peter Thal Larsen, "Inside Track: TV viewers can box clever: Technology Video Recorders: personal video recorders will be a godsend for viewers. But what about the schedulers", Financial Times London Ed., Jun. 23, 2000, p. 18, ISSN 0307-1766, 2000 Responsive Database Services, Inc. Business and Industry; 2000 Financial Times Ltd.

Patricia Sabga; Charles Molineaux, "TiVo-CEO, CNNfn", transcript # 00090110FN-107 interview Michael Ramsay, The N.E.W. Show, Sep. 1, 2000, Fri. 5:18 p.m. EST, 2000 Cable News Network.

Mary Kathleen Flynn; Steve Young, "Interactive TV, CNNFn", transcript #00081407FN-111 interview Josh Bernoff, Digital Jam, Aug. 14, 2000, Mon. 8:08 p.m. EST, 2000 Cable News Network.

"More 'convergence' digital video recorders emerge", Video Week, Jun. 19, 2000, section: This Week's News, 2000 Warren Publishing, Inc.

"TiVo and replay sign cable deals to boost PVR distribution", Warren's Cable Regulation Monitor, Aug. 21, 2000, section: This Week's News, 2000 Warren Publishing, Inc.

"Future VOD role of studios vs. other companies debated", Video Week, Apr. 10, 2000, section: This Week's News, 2000 Warren Publishing, Inc.

Raymond Snoddy, "The TiVo—T.V.'s nemesis?", Times Newspaper Ltd., Sep. 1, 2000, section: Features, 2000 Times Newspapers Limited (the Times London).

Marc Gunther; Irene Gashurov, "When technology attacks!; Your T.V. is looking weird. Network executives are getting flustered. Viewing choices are exploding. That's what happens . . . ", Fortune, Mar. 6, 2000, section: Features/Television, p. 152, 2000 Time Inc.

"Independent study shows TiVo service increases enjoyment and changes people's attitudes towards T.V.", PR Newswire, May 2, 2000, 2000 FT Asia Intelligence Wire; 2000 PR Newswire.

* cited by examiner

TECHNIQUE FOR SYNCHRONIZING DELIVERIES OF INFORMATION AND ENTERTAINMENT IN A COMMUNICATIONS NETWORK

The present application claims under 35 U.S.C. §119(e) the benefit of U.S. Provisional Application Ser. No. 60/377,963 filed on May 3, 2002.

FIELD OF THE INVENTION

The invention relates to communications systems and methods, and more particularly to a system and method for controlling the timing of deliveries of information and entertainment programs through a communications network, e.g., a cable network.

BACKGROUND OF THE INVENTION

Use of a cable network to broadcast programming content, e.g., TV programs, is well known. However, it has been proposed in the cable industry to record in-progress TV broadcast programs at a headend of the cable network, thereby enabling a user to manipulate the recorded programming content to perform such network personal video recorder (NPVR) functions as "pausing," "rewinding" and "fast-forwarding" on the programming content while it is being broadcast. The network architecture and functionalities required to effect these NPVR functions are described, e.g., in copending, commonly assigned application Ser. No. 10/263,015 filed on Oct. 2, 2002, hereby incorporated by reference.

Although providing users with NPVR functions enhances users' program viewing experience, the requisite network processing, e.g., recording programming content and accessing the recorded programming content in the headend, to effect such functions causes the recorded program stream to lag behind the broadcast program stream. That is, the recorded program stream received by a first user afforded the NPVR functions is a delayed version of the broadcast program stream received by a second, non-NPVR user. The unsynchronization of the two streams may be so significant that when the first and second users are communicating with each other (e.g., on the phone) on what they are viewing on TV, the first user is able to notice a delay in receiving the same information which the second user already received. As a result, the first user may feel "behind" the second user in receiving such real-time information as instant sports game scores and breaking news, which unsynchronization may be undesirable.

In another NPVR implementation, an NPVR user may experience the undesirable unsynchronization effect firsthand when the user receiving a recorded program stream is switched to receiving the corresponding broadcast program stream, and vice versa. In that implementation, an NPVR user is initially afforded a broadcast program stream until the user performs one of the NPVR functions, say, rewinding the programming content being broadcast. At such time, the user is switched from receiving the broadcast program stream to receiving the corresponding recorded program stream to perform the rewinding function. However, such stream switching may result in viewing repetitive programming content for the duration of the lag of the recorded program stream behind the broadcast program stream. Conversely, when the NPVR user, after performing the rewinding function, fast-forwards the programming content in the recorded program stream and catches up with the programming content being broadcast, the NPVR user may be switched back to receiving the broadcast program stream. However, such stream switching may result in skipping ahead the programming content being viewed, thereby undesirably creating an information gap which corresponds to the time lag of the recorded program stream behind the broadcast program stream.

SUMMARY OF THE INVENTION

The invention overcomes the prior art limitations by introducing a delay into the transmission of the broadcast program stream to reduce the time period (referred to as a "time lag") by which the transmission of the recorded program stream lags behind it. In theory, if the introduced delay equals the time lag, the two streams are completely synchronized. Thus, one of the objects of the invention is to obtain an accurate measure of the time lag.

However, in practice, NPVR users are provided with individual recorded program streams, respectively, whose time lag may vary from one recorded program stream to another, depending, e.g., on the instant conditions of the network which a user request for a recorded program stream traverses, the actual network location of the user terminal, etc. Thus, in an illustrative embodiment of the invention, the introduced delay may comprise a statistical measure of the time lags associated with the individual recorded program streams. In addition, it may be desirable to set an upper limit on the introduced delay. This stems from the fact that the introduction of the delay causes the programs in the broadcast program stream to start broadcasting later than their scheduled broadcast times, which may adversely affect a user's program enjoyment when the introduced delay is larger than one such upper limit (e.g., on the order of tens of seconds).

In another embodiment, the introduced delay is predetermined, which may be set to equal the aforementioned upper limit.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

The invention is directed to synchronizing transmissions of two program streams to account for a time delay occasioned by additional processing of one of them. As is well known, a broadband communications network, e.g., a cable network, may be utilized to broadcast programming content, e.g., in-progress TV programs, to cable TV viewers. However, it has been proposed in the cable industry to record a broadcast program stream at a headend of the cable network, thereby enabling a user to manipulate the recorded program stream to perform such network personal video recorder (NPVR) functions as "pausing," "rewinding" and "fast-forwarding" on programming content in the recorded program stream while the same programming content is being broadcast in the broadcast program stream. The recorded program stream is delivered to a first user afforded the NPVR functions while the broadcast program stream is delivered to a second, non-NPVR user. However, the requisite network processing, e.g., recording programming content and accessing the recorded programming content in the headend, causes the recorded program stream to lag behind the broadcast program stream.

Figure 1:
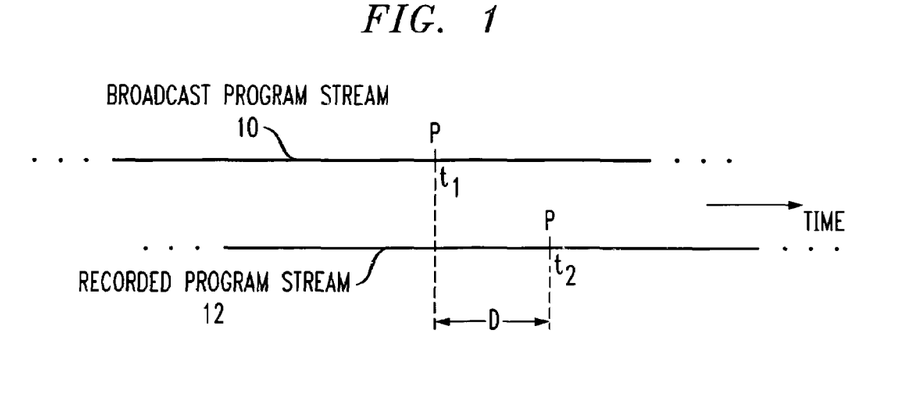
FIG. 1 illustrates an unsynchronization between a broadcast program stream and a recorded program stream provided in a broadband communications system.

As illustrated in FIG. 1, the recorded program stream (denoted 12) received by the first user lags behind the broadcast program stream (denoted 10) received by the second user by a time D. As a result, the second user receives instant information P in stream 10 at $t_1$ while the first user receives the same information in stream 12 at a later time $t_2$, where $t_2-t_1=D$. If D is significant (e.g., on the order of seconds), the unsynchronization of streams 10 and 12 is noticeable especially when the first and second users are communicating with each other (e.g., on the phone) on what they are viewing on TV. As a consequence, the first user may feel "behind" the second user in receiving such real-time information as instant sports game scores and breaking news, which unsynchronization may be undesirable.

An NPVR user may experience the undesirable unsynchronization effect firsthand if the user receiving recorded program stream 12 is switched to receiving broadcast program stream 10, and vice versa. Indeed, in an NPVR implementation, an NPVR user is initially afforded stream 10 until the user performs one of the NPVR functions, say, rewinding the programming content being broadcast. At such time, the user is switched from receiving stream 10 to receiving stream 12 to perform the rewinding function. However, such stream switching may result in viewing repetitive programming content for the duration of D. Conversely, when the NPVR user, after performing the rewinding function, fast-forwards the programming content in stream 12 and catches up with the programming content being broadcast, the NPVR user may be switched back to receiving stream 10. However, such stream switching may result in skipping ahead the programming content being viewed, thereby undesirably creating an information gap which corresponds to D.

In accordance with the invention, to synchronize a broadcast program stream and a recorded program stream, a delay is introduced into the transmission of the broadcast program stream to substantially reduce or eliminate the time lag D. In theory, if the introduced delay is exactly D, the two streams are completely synchronized. Thus, one of the objects of the invention is to obtain an accurate measure of D. However, in practice, NPVR users are provided with individual recorded program streams, respectively, whose D may vary from one recorded program stream to another, depending, e.g., on the instant conditions of the network which a user request for a recorded program stream traverses, the actual network location of the user set-top terminal, etc. Thus, in accordance with an aspect of the invention, the delay introduced into the broadcast program stream, dt, may comprise a statistical measure of the time lags D associated with the individual recorded program streams. In addition, it may be desirable to set an upper limit on dt. This stems from the fact that the introduction of the delay dt causes the programs in the broadcast program stream to start broadcasting later than their scheduled broadcast times, which may adversely affect a user's program enjoyment when dt is larger than one such upper limit (e.g., on the order of tens of seconds).

Figure 2:
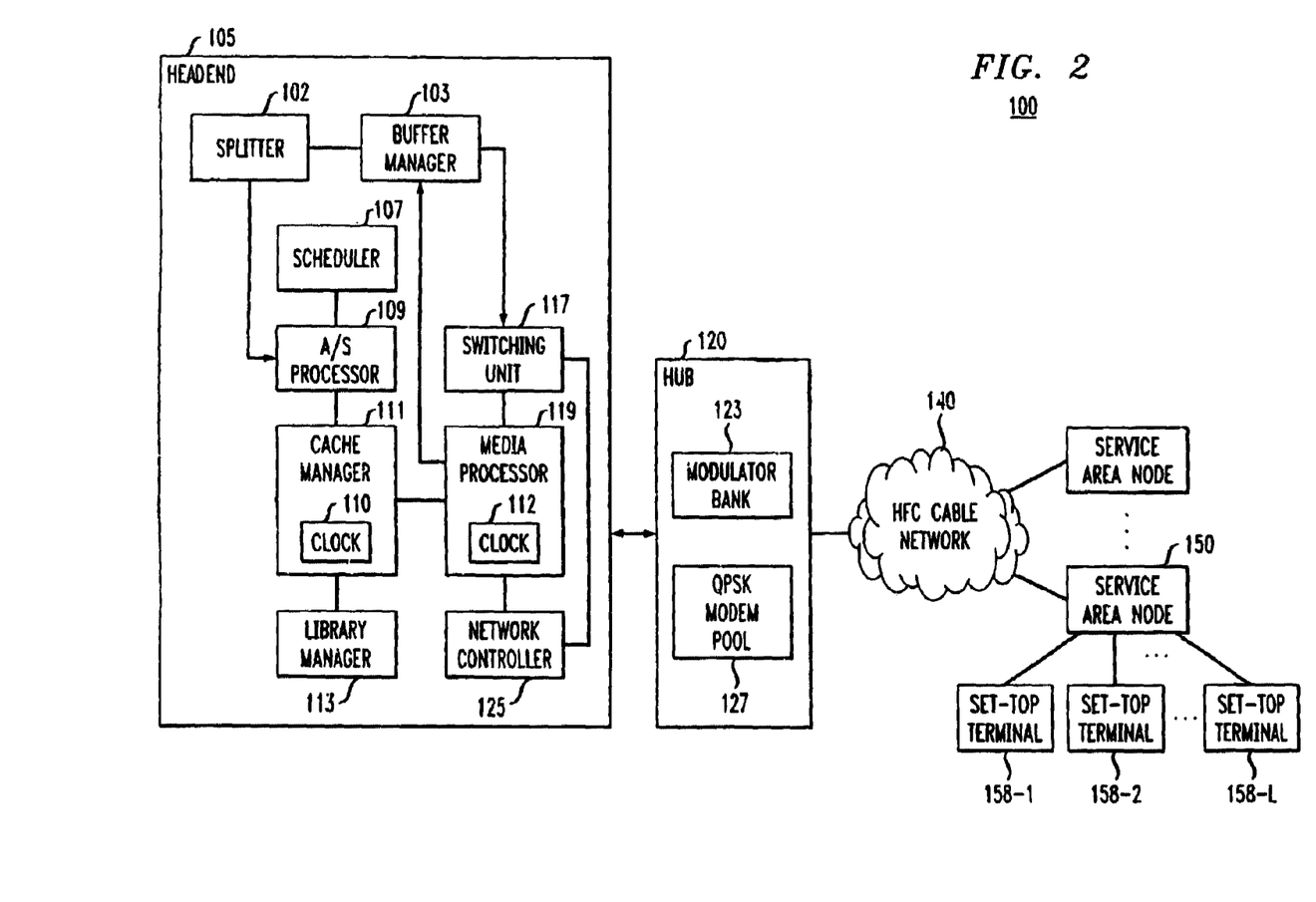
FIG. 2 is a block diagram of a broadband communications system in accordance with the invention.

FIG. 2 illustrates broadband communications system 100 which, among others, broadcasts programming content to viewers who are non-NPVR users, and records the programming content to afford NPVR functions to NPVR users. In accordance with the invention, transmission of the broadcast program stream shared by broadcast viewers is delayed by dt to better synchronize with transmissions of the recorded program streams to the respective NPVR users, where dt is a function of the aforementioned D, and dt may not be larger than T representing an upper limit of dt. In fact, in an alternative embodiment of the invention, dt is predetermined and may equal T.

As shown in FIG. 2, broadband communications system 100 comprises headend 105, hub 120, hybrid fiber coaxial (HFC) cable network 140 and different service area nodes including node 150, which in this instance is connected to set-top terminals 158-1 through 158-L in a neighborhood, where L represents an integer. In this illustrative embodiment, even in the same neighborhood, depending on their actual service subscription, users at some of the set-top terminals are broadcast viewers receiving the same broadcast program stream while others are NPVR users receiving individual recorded program streams, respectively.

Headend 105 includes splitter 102 which in this instance receives from various content providers (e.g., analog and digital satellite sources, application servers, media servers, and the Internet) a composite program stream which may contain analog TV streams formatted according to the National Television Standards Committee (NTSC) or phase alternating line (PAL) broadcast standard, and digital TV streams formatted according to the Digital Satellite System (DSS), Digital Broadcast Services (DBS), Advanced Television Standards Committee (ATSC), or Society of Cable Telecommunications Engineers (SCTE) digital video standard.

Upon receiving the composite program stream, splitter 102 duplicates the stream, and splits the resulting two identical streams such that one of them is forwarded to buffer manager 103 for broadcast, thus referred to as the "broadcast program stream." The other program stream is forwarded to acquisition/staging (A/S) processor 109 for further processing in a manner described below. Buffer manager 103 includes adjustable memory storage (not shown) for temporarily buffering the broadcast program stream to introduce the delay dt thereinto, in accordance with the invention. Specifically, in response to a delay signal from media processor 119 (described below), which contains a measure of dt (described below), manager 103 adjusts the capacity of the memory storage and allocates an appropriate storage space for buffering the broadcast program stream to effect the delay dt in its transmission. For example, the management of the memory storage may be in accordance with a first-in-first-out (FIFO) mechanism. As is well known, the longer the delay is desired, the larger the storage space allocated.

The aforementioned memory storage works particularly well with digital TV streams. However, as mentioned before, the composite program stream received by manager 103 may include analog TV streams. In that case, such analog streams may be converted to a digital format by a conventional analog-to-digital (A/D) converter in manager 103 before they are buffered in the memory storage. The digitally converted TV streams may be converted back to the original analog form by a conventional digital-to-analog (D/A) converter in manager 103, performing an inverse function to the A/D converter, before they are output from manager 103. Alternatively, manager 103 includes a delay-configurable TV streams. The VTR can be configured to reproduce the analog TV streams at the output of manager 103 after the delay dt.

A/S processor 109 processes the duplicate composite program stream to, among others, extract the program content in the duplicate stream, and reformat the content to form one or more MPEG-2 encoded transport streams. Such reformatting may even be applied to the received digital content already in an MPEG-2 format. This stems from the fact that such received digital content is typically encoded at a variable bit rate (VBR). To avoid data burstiness, processor 109 in a conventional manner re-encodes such digital content at a constant bit rate (CBR) to form the aforementioned transport streams.

Although MPEG-2 encoding is well known in the art, the following conveniently provides the necessary background understanding of MPEG-2 encoding:

MPEG-2 Background

In accordance with the MPEG-2 standard, video data may be compressed based on a sequence of groups of pictures (GOPs), made up of three types of picture frames, namely, intra-coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame.

A B-frame compares both the preceding and subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time-stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 4 to view program material provided by NBC; program channel 7 to view program material provided by ABC, etc.

In this illustrative embodiment, the transmission channels, each carrying a transport stream, may be 6 MHz bands populating a forward passband, e.g., 350–750 MHz band, of a coaxial cable, which is allocated for downstream communication from headend 105 to a set-top terminal.

A/S processor 109 may receive "assets" including pre-staged movie videos, news reports, sports events, etc. from the content providers. However, processor 109 may also create "assets" in real time while processing received program materials which are not pre-staged by the content providers. In general, an "asset" is a container for any object or set of objects that may be desired to implement a service, including video, audio, images, application executables, scripts, configuration files, text, fonts, and HTML pages. In addition to the raw content, asset metadata is also a part of an asset object that describes characteristics of the asset. For example, asset metadata may describe attributes that are inherent in the content of the asset, such as the format, duration, size, or encoding method. Values for asset metadata are determined at the time the asset is created.

Figure 3:
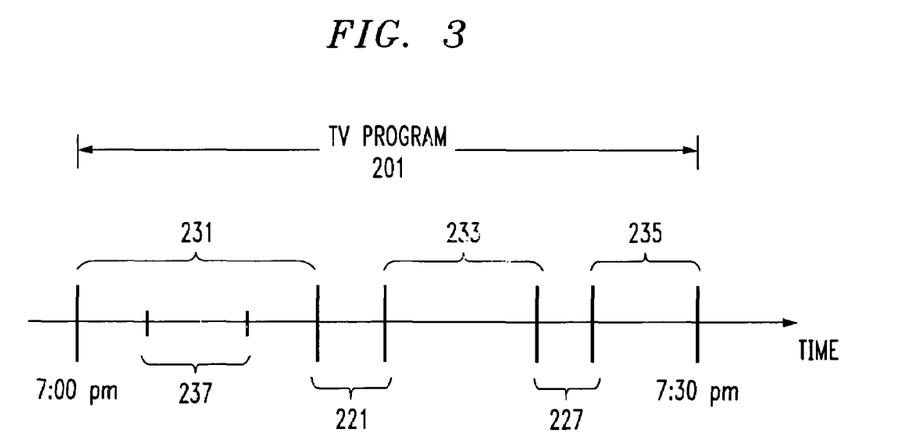
FIG. 3 illustrates a TV program comprising multiple program segments which is provided in the system of FIG. 2.

In this illustrative embodiment, an asset concerning a program includes a metadata file and trick files associated with the program, in addition to the program content contained in a transport stream. FIG. 3 illustrates TV program 201 which spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. The program stream received by processor 109 is preprocessed, e.g., by the providers, to include indicators, e.g., cue-tones, on which processor 109 relies to identify the demarcations (or edges) of different programs and program segments within each program. Thus, in this instance before processor 109 processes the stream containing TV program 201, a first cue-tone is inserted at the beginning of segment 231, indicating the beginning of TV program 201; second cue-tones are inserted at the beginnings of segments 221 and 227, indicating the beginnings of the respective commercial breaks; third cue-tones are inserted at the ends of segments 221 and 227, indicating the ends of the respective commercial breaks; and a fourth cue-tone is inserted at the end of segment 235, indicating the end of TV program 201. Another set of cue-tones may be inserted to delimit a "chapter" (denoted 237) within a duplicated program. A chapter is a self-contained subprogram, e.g., a skit, monolog, song performance, news report, weather report, etc. within a program. With the cue-tones defining one such chapter, processor 109 is capable of identifying the chapter and create an asset concerning the same.

Processor 109, among other things, collects in a database (not shown) program guide data associated with different TV programs (including TV program 201 in this instance) from an application server, which may be different from the sources of the TV programs themselves. Each program when presented to processor 109 is identified by a program designation, which may be used to locate the corresponding program guide data. In particular, processor 109 while processing TV program 201 may locate the corresponding program guide data, e.g., through scheduler 107, to create in real time the metadata file associated with TV program 201. The metadata file thus created includes such data as the title, rating (e.g., G, PG-13, R, etc.), names of the producer, director, and actors, duration of the program, program type (e.g., situation comedy), etc.

Processor 109 may also create in real time trick files associated with program 201 as part of the asset which are used to perform the NPVR functions on program 201. One such trick file in this instance is a "fast-forward" trick file which contains an array of identifiers of I-frames in the MPEG-2 program stream corresponding to program 201 in a forward direction. Another trick file is a "rewind" trick file which contains an array of identifiers of I-frames in the MPEG-2 program stream corresponding to recorded program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

The transport streams generated by processor 109 are fed to cache manager 111. The latter includes a cache memory (not shown), e.g., a disk cache, having a memory capacity on the order of terabytes. Manager 111 stores and thereby records the transport streams onto the cache memory, and also forwards the same to library manager 113 for long-term storage. The latter includes library storage having a memory capacity on the order of hundreds of terabytes, much larger than that of the cache memory such that the cache memory stores the last Y hours' worth of the TV programs while the library storage stores the last Z hours' worth of the TV programs, where the value of Z is much greater than that of Y. It suffices to know for now that use of the cache memory, which affords faster access to its content than the library storage, facilitates a speedy retrieval of a requested recorded program in the event of a "cache hit," i.e., the requested recorded program being within the last Y hour broadcast. Otherwise, a "cache miss" causes locating the requested recorded program in the library storage, thereby incurring a delay in the retrieval of the recorded program.

Scheduler 107 receives information relating to the time that a program is scheduled to broadcast. Programming schedule data is received from, in an embodiment of the invention, an electronic program guide (EPG) server (not shown), and includes a program identification code for each program and the start time respecting each program. When a duplicate program is received by A/S processor 109, schedule information, including program start time, for the given program is provided to A/S processor 109 and is associated with the program. This is accomplished, in an embodiment of the invention, by matching the program identification code and associated scheduling data received by scheduler 107 with the program identification code of the program received by A/S processor 109.

It should be noted at this juncture that receiving programming content by A/S processor 109, associating data (such as scheduling data) to create the program asset and storing the asset by cache manager 111 requires a certain amount of processing time. This processing time, referred to as "programming recording processing time," is a function of, among others, the rate of the programming content, the amount of processing required to complete an asset and the availability of processing resources. Such programming recording processing time, described further below, contributes to the aforementioned time lag D of the transmission of a recorded program stream relative to that of the broadcast program stream.

Network controller 125, among others, assigns resources for transporting program materials to set-top terminals and communicates various data including system information with the terminals. Upstream data from a set-top terminal to network controller 125 is communicated via a reverse passband, e.g., 5–40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 125 may change after a system reconfiguration. Nevertheless, each set-top terminal and controller 125 is also assigned a media access control (MAC) address on a permanent basis, surviving any system reconfiguration.

Downstream data from network controller 125 to a set-top terminal is communicated via forward data channels (FDCs). These channels, often referred to as "out-of-band" channels, may occupy the 70–130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

In this illustrative embodiment, when a broadcast viewer turns on a TV to view programming content, because of a particular setup of the viewer's set-top terminal, the broadcast viewer automatically receives such programming content delivered in the aforementioned broadcast program stream, which is delayed by buffer manager 103 in accordance with the invention. The delayed broadcast program stream from manager 103 is switched by switching unit 117 to an appropriate modulator in hub 120 to be broadcast to the viewer through HFC network 140 in a conventional manner.

However, when an NPVR user turns on a TV to view programming content, because of another setup of the user's set-top terminal, the user may receive the same broadcast programming content albeit from a recorded program stream from cache 111. Specifically, when an NPVR user at a set-top terminal, say, terminal 158-1, turns on the TV associated therewith and selects a particular program channel, say program channel 2. Terminal 158-1 in a well known manner scans for any transport streams transporting programs to the neighborhood. In system 100, each transport stream is identified by a unique transport stream identification (TSID).

Figure 4:
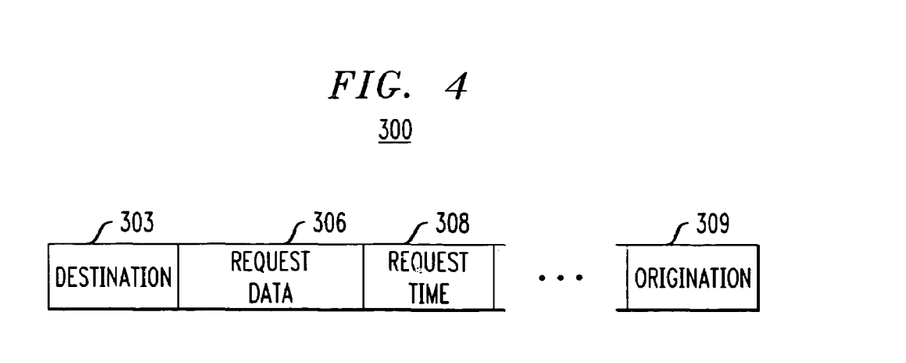
FIG. 4 illustrates a request for recorded program material from a set-top terminal in the system of FIG. 2.

Continuing the above example, once the TSIDs of the transport streams are detected, terminal 158-1 sends through QPSK modem pool 127 a request for program channel 2 material. FIG. 4 illustrates one such request (denoted 300) sent from a set-top terminal to network controller 125 via an RDC. As shown in FIG. 4, request 300 includes, among others, destination field 303 which in this instance contains the IP address of network controller 125 for which request 300 is destined; request data field 306 which contains data concerning the detected TSIDs and the requested program channel material, e.g., program channel 2 material in this instance; request time field 308 containing a request initiation time-stamp generated by a clock (not shown) in terminal 158-1 indicating the time at which request 300 was initiated thereby; and origination field 309 which in this instance contains the IP (and/or MAC) address of terminal 158-1 from which request 300 originates.

Figure 5:
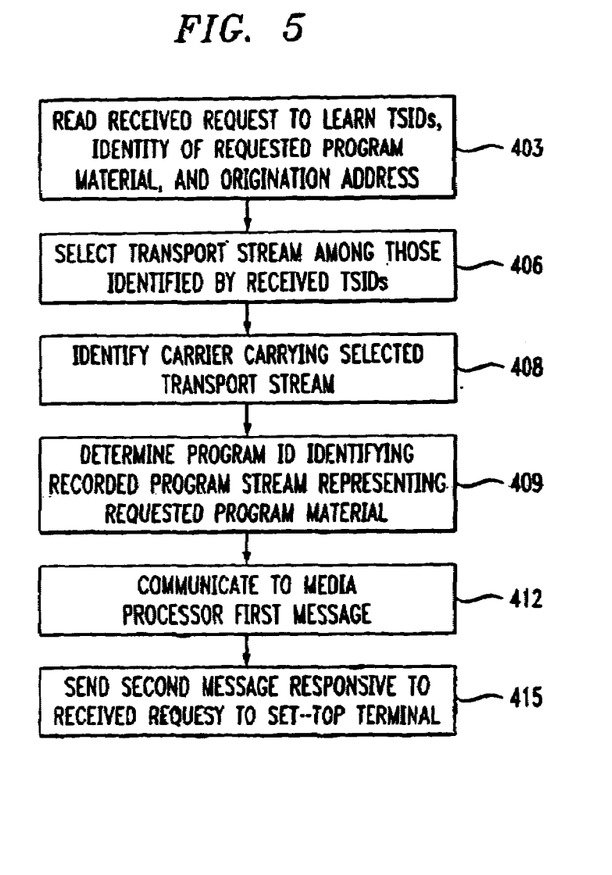
FIG. 5 is a flow chart depicting a process for providing program material in response to the request of FIG. 4.

After receiving request 300, network controller 125 reads the received request to learn the TSIDs, the identity of the requested program material, and the origination address therein, as indicated at step 403 in FIG. 5. Network controller 125 communicates with media processor 119 to determine the capacity required for transmitting the requested program material. Based on the required capacity, controller 125 at step 406 selects a transport stream among those identified by the received TSIDs which is suitable for transporting the requested program material. Controller 125 at step 408 identifies the carrier carrying the selected transport stream.

Figure 6:
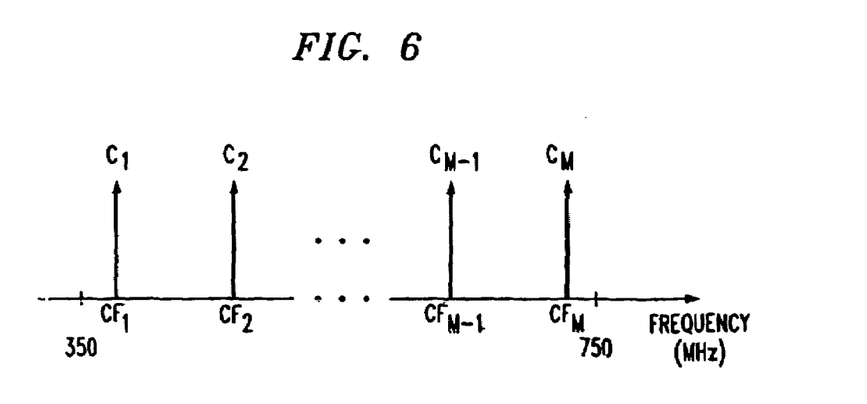
FIG. 6 illustrates selected carriers for transmitting program materials in a forward passband of the system of FIG. 2.

Referring also to FIG. 2, modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 6 illustrates M carriers, $C_1$ through $C_M$, associated with M transmission channels in the forward passband. As shown in FIG. 6, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123 in this instance may modulate up to 9 program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up from the table the carrier associated with the TSID of the selected transport stream. Based on the requested program channel, network controller 125 at step 409 determines the program ID identifying the recorded program stream representing the requested program material, i.e., program channel 2 material in this instance, which is then multiplexed with other recorded program streams in the selected transport stream. At step 412, network controller 125 communicates to media processor 119 a first message containing the identity of the modulator in modulator bank 123 which corresponds to the carrier, say, $C_1$, just determined, the program ID associated with the requested program channel material just determined, and the request initiation time-stamp from field 308 of received request 300. Network controller 125 at step 415 sends, through QPSK modem pool 127, a second message responsive to the received request to set-top terminal 158-1 identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired recorded program stream, representing in this instance program channel 2 material, within the transport stream.

In response to the first message, processor 119 directs cache manager 111 to deliver a copy of the recorded program stream representing the requested program channel material thereto and causes the recorded program stream to be multiplexed with any other recorded program streams already in the transport stream identified by the selected TSID. In addition, processor 119 causes switching unit 117 to switch the resulting transport stream to the modulator corresponding to the carrier $C_1$. Accordingly, the modulator modulates the carrier $C_1$ with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance. In a well known manner, terminal 158-1 converts the extracted recorded program stream to appropriate signals for the associated TV to play program channel 2 material.

It should be noted at this juncture that the user request for accessing programming content in a recorded program stream requires a certain amount of processing time (referred to as "user request processing time"), which also contributes to the time lag D of the transmission of the recorded program stream relative to that of the broadcast program stream. The user request processing time includes, e.g., the time required for communicating request 300 from set-top terminal 158-1 to headend 105, and the time required for identifying and allocating in the headend the appropriate transport stream resource for transmitting the recorded program stream to terminal 158-1 in response to request 300.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

When the NPVR user issues a pause command to terminal 158-1, e.g., by pressing a "pause" key on a remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect.

Figure 7:
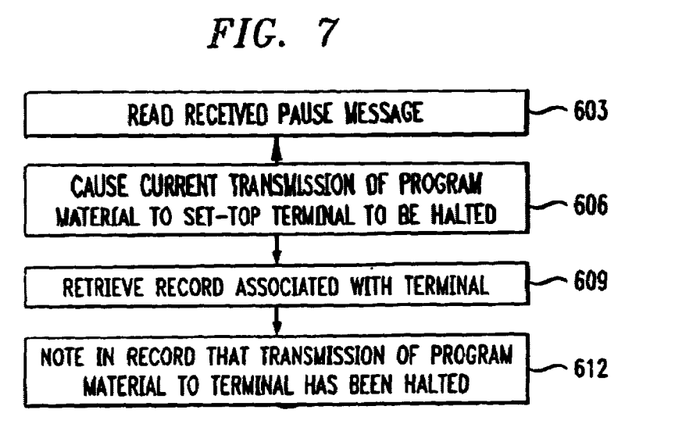
FIG. 7 is a flow chart depicting a process for pausing a program in response to a pause message from a set-top terminal.

After receiving the pause message, processor 119 reads the received pause message, as indicated at step 603 in FIG. 7. Processor 119 at step 606 causes the current transmission of the program material to set-top terminal 158-1 (identified by the received IP and/or MAC address) to be halted at the I-frame immediately following the last I-frame identified in the received message. Processor 119 at step 609 retrieves the record associated with terminal 158-1. Processor 119 at step 612 notes in the record that the transmission of the program material to terminal 158-1 has been halted at I-frame$_{pause}$.

When the NPVR user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming recorded program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming recorded program stream would be correctly delivered to terminal 158-1 even after a system reconfiguration.

Figure 8:
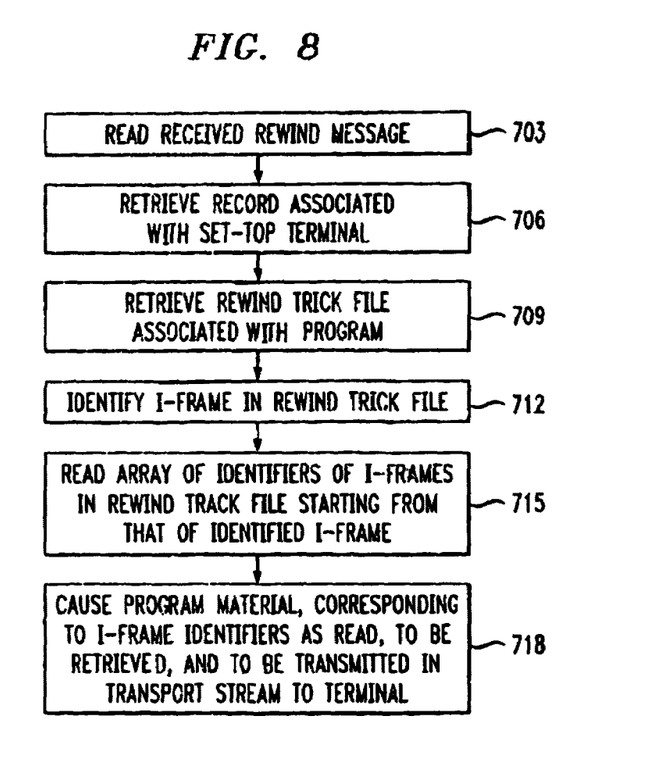
FIG. 8 is a flow chart depicting a process for rewinding a program in response to a rewind message from a set-top terminal.

While viewing a program, the NPVR user may issue a rewind command, e.g., by pressing a rewind key on the remote control, to rewind the program. In that case, terminal 158-1 issues a rewind message to processor 119 identified by its IP address. This rewind message includes a rewind initiation command, the last I-frame identifier registered by terminal 158-1, and the IP address (and/or MAC address) identifying terminal 158-1.

After receiving such a rewind message, processor 119 reads the received rewind message, as indicated at step 703 in FIG. 8. Processor 119 at step 706 retrieves the record associated with set-top terminal 158-1 identified by the received IP address (and/or MAC address). Knowing from the record the identity of the program being transmitted, processor 119 at step 709 retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame. Processor 119 at step 718 causes the recorded program material, corresponding to the I-frame identifiers as read, to be retrieved from cache manager 111, and to be transmitted in the transport stream to terminal 158-1, thereby achieving the desired rewind effect.

When the NPVR user issues a command to stop rewinding the program, e.g., by toggling the rewind key on the remote control, terminal 158-1 sends a rewind termination message to processor 119. In another embodiment where toggling the rewind key enables a user to change the rewind speed, e.g., 2 times the initial speed, the user may need to press the stop key on the remote control to stop rewinding the program. The rewind termination message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the recorded program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Figure 9:
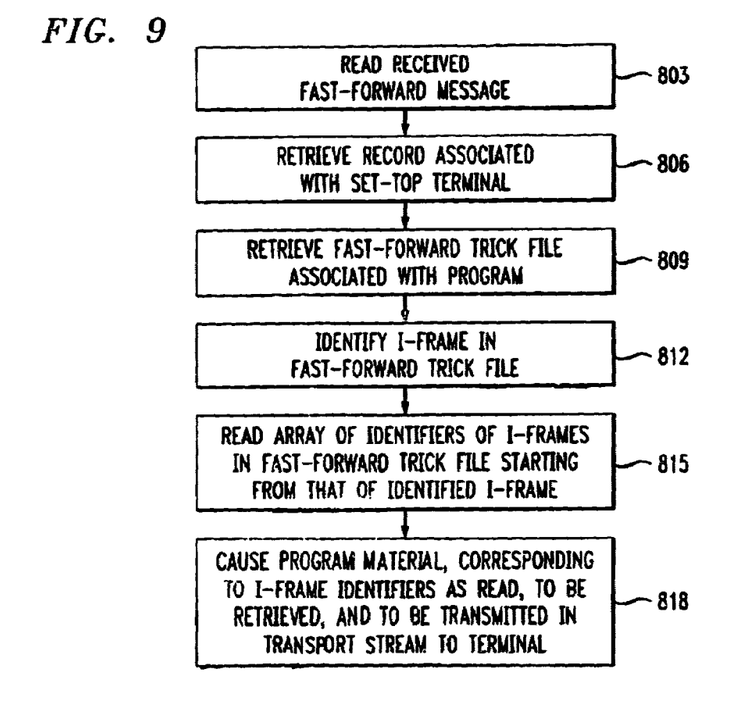
FIG. 9 is a flow chart depicting a process for fast-forwarding a program in response to a fast-forward message from a set-top terminal.

After rewinding a program, the NPVR user may issue a fast-forward command, e.g., by pressing a fast-forward key on the remote control, to fast-forward the program. In that case, terminal 158-1 issues a fast-forward message to processor 119 identified by its IP address. This fast-forward message includes a fast-forward initiation command, the last I-frame identifier registered by terminal 158-1, and the IP address (and/or MAC address) identifying terminal 158-1.

After receiving such a fast-forward message, processor 119 reads the received fast-forward message, as indicated at step 803 in FIG. 9. Processor 119 at step 806 retrieves the record associated with set-top terminal 158-1 identified by the received IP address (and/or MAC address). Knowing from the record the identity of the program being transmitted, processor 119 at step 809 retrieves from the aforementioned asset storage the fast-forward trick file associated with the program. Based on the last I-frame information in the received message, processor 119 at step 812 identifies the I-frame in the fast-forward trick file which either matches or is the closest to that last I-frame. Processor 119 at step 815 reads the array of identifiers of the I-frames in the fast-forward trick file starting from that of the identified I-frame. Processor 119 at step 818 causes the recorded program material, corresponding to the I-frame identifiers as read, to be retrieved from cache manager 111, and to be transmitted in the transport stream to terminal 158-1, thereby achieving the desired fast-forward effect.

When the NPVR user issues a command to stop fast-forwarding the program, e.g., by toggling the fast-forward key on the remote control, terminal 158-1 sends a fast-forward termination message to processor 119. In another embodiment where toggling the fast-forward key enables a user to change the fast-forward speed, e.g., 2 times the initial speed, the user may need to press the stop key on the remote control to stop fast-forwarding the program. The fast-forward termination message includes a fast-forward termination command, and the IP address (and/or MAC address) of terminal 158-1. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the recorded program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Determination of Delay dt

As mentioned before, the contributions to the time lag D in this illustrative embodiment include (1) the programming recording processing time, $D_1$, and (2) the user request processing time, $D_2$. It is apparent from the disclosure heretofore that the value of $D_1$ is the same for different recorded program streams transmitted to the respective NPVR users. However, $D_2$ may vary from one user request for a recorded program stream to another, depending, e.g., on the instant traffic condition of network 140, the actual network location of the NPVR user set-top terminal, and the instant processing rates of headend components, in particular, network controller 125 and media processor 119. In another embodiment, $D_2$ also depends on the actual storage location from which the recorded program stream is retrieved. In that embodiment, the recorded program stream may be cached in a distributed manner, e.g., in a headend and/or one or more hubs. For example, based on the user's network location, the recorded program stream is retrieved from one of the headend and hubs to expeditiously meet the user request.

Figure 10:
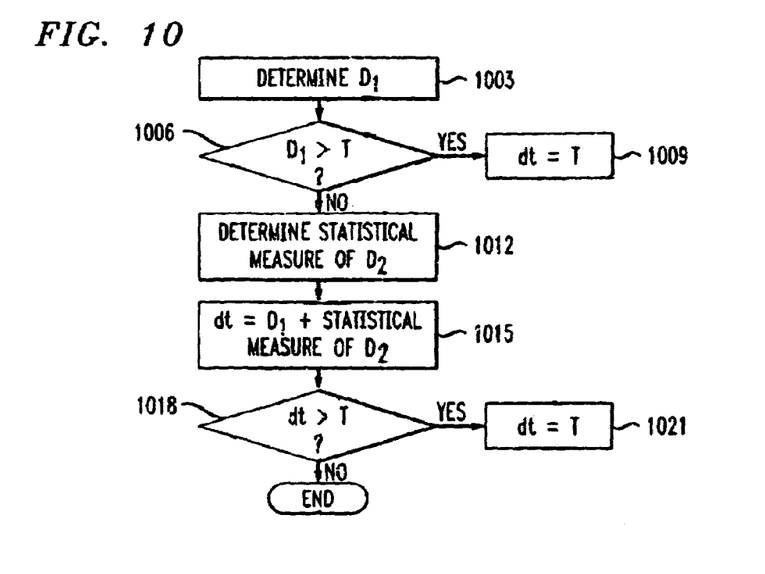
FIG. 10 is a flow chart depicting a process for determining an amount of a delay to be introduced into the broadcast program stream to reduce the aforementioned unsynchronization in accordance with the invention.

FIG. 10 is a flowchart depicting a process for determining dt to be introduced into the broadcast program stream, in accordance with the invention. At step 1003, $D_1$ is determined by cache manager 111 computing the difference between (a) the time at which a program is scheduled to broadcast and (b) the time at which the program is stored by cache manager 111 after it is received and processed by A/S processor 109. As described above, each program is associated with a scheduled broadcast time, which is provided by scheduler 107 and is passed onto cache manager 111. The time (b) is read by manager 111 from clock 110 when the program is actually stored in the cache memory therein.

The computed $D_1$ is transmitted from manager 111 to media processor 119. At step 1006, processor 119 determines whether $D_1$ is greater than the aforementioned upper limit T. If so, dt is set to equal T, as indicated at step 1009. Otherwise, the subject process proceeds to step 1012 where processor 119 determines a statistical measure of $D_2$.

For each user request for a recorded program stream, $D_2$ is determined by processor 119 computing a difference between (i) the time at which the user request was initiated and (ii) the time at which processor 119 causes a delivery of the recorded program stream. The time (i) is specified by the request initiation time-stamp received by processor 119 in the first message at step 412 in FIG. 5 described above. The time (ii) is read by processor 119 from clock 112 providing the current time when processor 119 actually causes a delivery of the recorded program stream from manager 111. As mentioned before, $D_2$ varies from one user request for a recorded program stream to another. As such, a statistical measure of $D_2$ is used in this illustrative embodiment. For example, such a statistical measure may be formed by averaging the user request processing times $D_2$ experienced by processor 119 over a predetermined period (e.g., a preceding six hour period). Another example of such a statistical measure may be a certain percentile (e.g., a 75 percentile) measure of the user request processing times $D_2$ experienced over a predetermined period. In addition, the statistical measure may be derived from a significant sample of the user population, rather than considering every user and his/her request.

At step 1015, processor 119 sets dt to equal the sum of $D_1$ and the statistical measure of $D_2$. Processor 119 at step 1018 determines whether dt is greater than T. If so, dt is set to equal T, as indicated at step 1021. Otherwise, the subject process comes to an end. Processor 119 transmits the aforementioned delay signal containing the resulting dt value to buffer manager 103. As described before, manager 103 adjusts the memory storage therein according to the received dt value to introduce a delay dt into the broadcast program stream received thereby. In addition, such an adjustment may be performed periodically, e.g., 3:00 am everyday, when there may be the least viewers whom may be affected by the adjustment.

It should be noted that the process of FIG. 10 may be repeated from time to time to update dt because $D_1$ and $D_2$ are both time variant.

Again, in the alternative embodiment, the delay imposed onto the broadcast program stream may be predetermined. In that embodiment, none of the $D_1$ and $D_2$ calculations are required of manager 111 and processor 119, and buffer manager 103 simply allocates a predetermined amount of memory storage corresponding to the predetermined delay.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the delay dt applied to the broadcast program stream is uniform across the program channels. However, it will be appreciated that dt may vary from one program channel to another. In that case, each program stream may be buffered in buffer manager 103 for a different duration dt.

In addition, in the disclosed embodiment, splitter 102 and buffer manager 103 are illustratively situated within headend 105. In another embodiment, such splitter and buffer manager functions may occur outside of headend 105.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A communication system for delivering programming content, comprising:
    a first transmitting device for transmitting a first program stream containing the programming content;
    a processor for generating a second program stream containing a copy of the programming content;
    a second transmitting device for transmitting the second program stream, a transmission of the second program stream lagging behind a transmission of the first program stream by a time period;
    a controllable delay device; and
    a control device for controlling a delay introduced into the transmission of the first program stream by the controllable delay device to reduce or eliminate the lagging of the transmission of the second program stream; and
    wherein the first transmitting device, the processor, the second transmitting device, the controllable delay device, and the control device are located at a headend.

2. The system of claim 1 wherein the delay is adjustable.

3. The system of claim 2 wherein the delay is adjusted periodically.

4. The system of claim 1 further comprising an interface for receiving a signal from a user terminal, wherein the first program stream is provided to a user terminal, and in response to the received signal, the second program stream is provided to the user terminal in lieu of the first program stream.

5. The system of claim 4 wherein the signal contains a request for performing a selected one of rewinding, pausing and fast-forwarding functions on the programming content.

6. The system of claim 1 wherein the second program stream is provided to a user terminal, and upon detection of a condition, the first program stream is provided to the user terminal in lieu of the second program stream.

7. The system of claim 6 wherein the copy of the programming content includes a copy of program material being currently broadcast, and the condition occurs when the user terminal receives the copy of program material being currently broadcast.

8. The system of claim 1 wherein the first program stream is transmitted to broadcast the programming content.

9. The system of claim 1 wherein the second program stream is transmitted upon a request received by the system.

10. The system of claim 1 wherein the delay is effected by allocating a storage space for temporarily storing the first program stream.

11. The system of claim 10 wherein an amount of the storage space varies with an amount of the delay.

12. The system of claim 1 wherein the second program stream is manipulatable to perform a selected one of rewinding, pausing and fast-forwarding functions on the copy of the programming content.

13. The system of claim 1 wherein an amount of the delay is limited by an upper bound.

14. The system of claim 1 wherein an amount of the delay is predetermined.

15. The system of claim 1 wherein the first transmitting device includes the second transmitting device.

16. A communications system for delivering programming content, comprising:
    a first transmitting device for transmitting a first program stream containing the programming content;
    a processor for providing a second program stream containing a copy of the programming content;
    a second transmitting device for transmitting the second program stream;
    a measuring device for measuring at least one processing time for providing the second program stream;
    a controllable delay device; and
    a control device for controlling a delay introduced into a transmission of the first program stream by the controllable delay device to compensate for the at least one processing time; and
    wherein the first transmitting device, the processor, the second transmitting device, the controllable delay device, and the control device are located at a headend.

17. The system of claim 16 wherein the delay is adjustable.

18. The system of claim 17 wherein the delay is adjusted periodically.

19. The system of claim 16 wherein the at least one processing time includes a duration for recording the programming content.

20. The system of claim 16 wherein the at least one processing time includes a duration for preparation for a transmission of the second program stream in response to a request received by the system.

21. The system of claim 20 wherein the duration is a function of a condition of a network which the request traverses.

22. The system of claim 20 wherein the delay comprises a statistical measure of the duration.

23. The system of claim 16 wherein the first program stream is transmitted to broadcast the programming content.

24. The system of claim 16 wherein the second program stream is transmitted upon a request received by the system.

25. The system of claim 16 wherein the delay is effected by allocating a storage space for temporarily storing the first program stream.

26. The system of claim 25 wherein an amount of the storage space varies with an amount of the delay.

27. The system of claim 16 wherein the second program stream is manipulatable to perform a selected one of rewinding, pausing and fast-forwarding functions on the copy of the programming content.

28. The system of claim 16 wherein the delay is limited by an upper bound.

29. The system of claim 16 wherein the first transmitting device includes the second transmitting device.

30. A method for use in a communications system for delivering programming content, comprising:
transmitting a first program stream containing the programming content;
generating a second program stream containing a copy of the programming content;
transmitting the second program stream, a transmission of the second program stream lagging behind a transmission of the first program stream by a time period; and
temporarily buffering the first program stream to introduce a delay into the transmission of the first program stream to reduce or eliminate the lagging of the transmission of the second program stream; and
wherein the buffering, the transmission of the first program stream, and the transmission of the second program stream are performed at a headend.

31. The method of claim 30 wherein the delay is adjustable.

32. The method of claim 31 wherein the delay is adjusted periodically.

33. The method of claim 30 further comprising an interface for receiving a signal from a user terminal, wherein the first program stream is provided to a user terminal, and in response to the received signal, the second program stream is provided to the user terminal in lieu of the first program stream.

34. The method of claim 33 wherein the signal contains a request for performing a selected one of rewinding, pausing and fast-forwarding functions on the programming content.

35. The method of claim 30 wherein the second program stream is provided to a user terminal, and upon detection of a condition, the first program stream is provided to the user terminal in lieu of the second program stream.

36. The method of claim 35 wherein the copy of the programming content includes a copy of program material being currently broadcast, and the condition occurs when the user terminal receives the copy of program material being currently broadcast.

37. The method of claim 30 wherein the first program stream is transmitted to broadcast the programming content.

38. The method of claim 30 wherein the second program stream is transmitted upon a request received by the system.

39. The method of claim 30 wherein the delay is effected by allocating a storage space for temporarily storing the first program stream.

40. The method of claim 39 wherein an amount of the storage space varies with an amount of the delay.

41. The method of claim 30 wherein the second program stream is manipulatable to perform a selected one of rewinding, pausing and fast-forwarding functions on the copy of the programming content.

42. The method of claim 30 wherein an amount of the delay is limited by an upper bound.

43. The method of claim 30 wherein an amount of the delay is predetermined.

44. A method for use in a communications system for delivering programming content, comprising:
transmitting a first program stream containing the programming content;
providing a second program stream containing a copy of the programming content;
transmitting the second program stream;
measuring at least one processing time for providing the second program stream; and
temporarily buffering the first program stream to introduce a delay into a transmission of the first program stream to compensate for the at least one processing time and thereby reduce or eliminate a the transmission of the second program stream behind the first program stream; and wherein the buffering, the transmission of the first program stream, and the transmission of the second program stream are performed at a headend.

45. The method of claim 44 wherein the delay is adjustable.

46. The method of claim 45 wherein the delay is adjusted periodically.

47. The method of claim 44 wherein the at least one processing time includes a duration for recording the programming content.

48. The method of claim 44 wherein the at least one processing time includes a duration for preparation for a transmission of the second program stream in response to a request received by the system.

49. The method of claim 48 wherein the duration is a function of a condition of a network which the request traverses.

50. The method of claim 48 wherein the delay comprises a statistical measure of the duration.

51. The method of claim 44 wherein the first program stream is transmitted to broadcast the programming content.

52. The method of claim 44 wherein the second program stream is transmitted upon a request received by the system.

53. The method of claim 44 wherein the delay is effected by allocating a storage space for temporarily storing the first program stream.

54. The method of claim 53 wherein an amount of the storage space varies with an amount of the delay.

55. The method of claim 44 wherein the second program stream is manipulatable to perform a selected one of rewinding, pausing and fast-forwarding functions of the copy of the programming content.

56. The method of claim 44 wherein the delay is limited by an upper bound.

* * * * *